No. 717,644. PATENTED JAN. 6, 1903.
W. O. WHITE.
MACHINE FOR GRUBBING SAGE BRUSH.
APPLICATION FILED AUG. 13, 1901. RENEWED JUNE 26, 1902.
NO MODEL. 2 SHEETS—SHEET 2
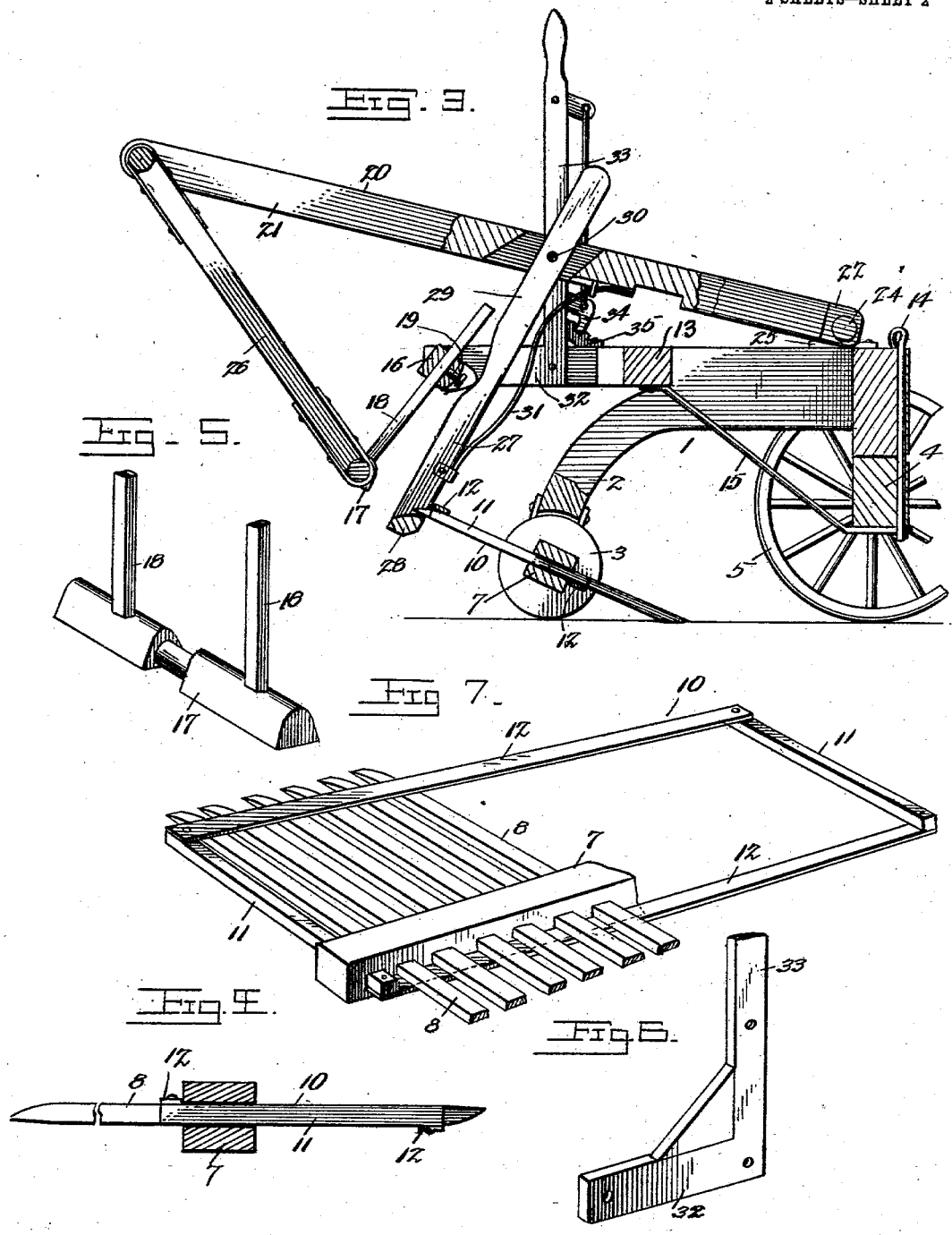
Witnesses
W. O. White Inventor

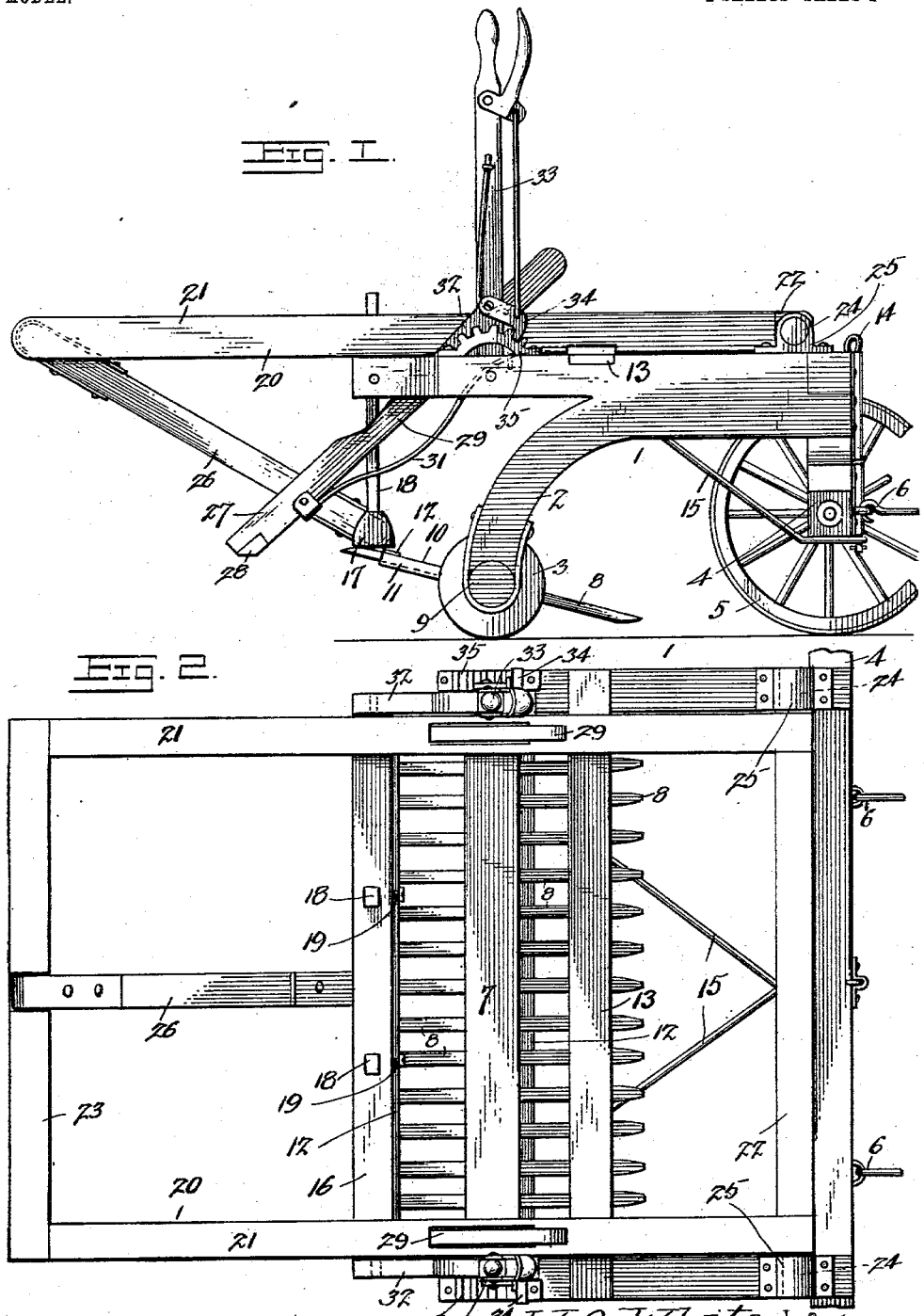

UNITED STATES PATENT OFFICE.

WILLIAM O. WHITE, OF ROBERTSON, WYOMING.

MACHINE FOR GRUBBING SAGE-BRUSH.

SPECIFICATION forming part of Letters Patent No. 717,644, dated January 6, 1903.

Application filed August 13, 1901. Renewed June 26, 1902. Serial No. 113,326. (No model.)

*To all whom it may concern:*

Be it known that I, WILLIAM O. WHITE, a citizen of the United States, residing at Robertson, in the county of Uinta and State of Wyoming, have invented a new and useful Machine for Grubbing Sage-Brush, of which the following is a specification.

My invention is an improved grubbing-machine especially adapted for grubbing out sage-brush and other brush; and it consists in the peculiar construction and combination of devices hereinafter fully set forth and claimed.

In the accompanying drawings, Figure 1 is a side elevation of my improved sage-brush-grubbing machine, showing the same in operative position. Fig. 2 is a top plan view of the same. Fig. 3 is a vertical longitudinal sectional view of the same, showing the grubbing-rake head in position when being overturned and reversed for depositing the grubbed brush in a windrow. Fig. 4 is a detail sectional view of the revoluble grubbing-rake. Fig. 5 is a detail perspective view of the rake-stop. Fig. 6 is a detail view. Fig. 7 is a detail perspective view of the revoluble grubbing-rake, showing the clearing-frame thereon.

In the embodiment of my invention here shown the main frame 1 is provided at its rear corners with standards 2, which carry supporting-rollers 3. The front end of the frame is mounted on an axle 4, which is provided with supporting-wheels 5 and to which the draft-pole may be attached, as at 6. The grubbing-rake comprises a revoluble head 7, and a series of tines or bars 8, which extend through the same, are spaced an appropriate distance apart and project from opposite sides of said revoluble head. The latter is journaled in the standards 2, as at 9, and the supporting wheels or rollers 3 have their bearings on spindles formed at the ends of said head. The clearing-frame 10 comprises a pair of side bars 11, which operate in openings in the head 7, and a pair of clearing-bars 12, which connect the ends of said bars 11 and are disposed, respectively, on opposite sides thereof. The said clearing-bars 12 extend transversely across the tines or rake-bars 8, as shown. In the form of my invention here shown the sides of the frame 1 are connected together by a cross-bar 13, and the latter is connected to the king-bolt 14 by a brace 15.

A rock-shaft 16 has its bearings in the rear ends of the side bars of the frame 1. The rake-stop 17, which is adapted to bear on the rear side of the revoluble grubbing-rake and maintain the same in operative position is provided with bars 18, which connect it to the rock-shaft 16. The said bars 18 pass through openings in the rock-shaft 16 and are adjustably secured therein, as by set-screws 19.

On the upper side of the frame 1 is a hand-frame 20. The same comprises a pair of side bars 21, a front connecting-bar 22, and a connecting cross-bar 23 at the rear ends of said side bars. The ends of the bar 22 are formed into spindles 24, which are journaled in bearings 25 on the front corners of the frame 1. The side bars 21 extend rearwardly from the frame 1, and thereby the rear cross-bar 23 is adapted to be readily grasped by an operator who walks in rear of the machine. A link 26 connects the central portion of the cross-bar 23 to the central portion of the rake-stop 17, as shown. From the foregoing and by reference to the drawings it will be understood that when the rear end of the hand-frame is raised the rake-stop is moved rearwardly out of engagement with the grubbing-rake, so that the latter may be caused by the forward motion of the machine to completely overturn, and thereby discharge itself of the brush accumulated thereon.

An oscillating frame 27 comprises a cross-bar 28 and a pair of side arms 29 at the ends thereof. The said side arms are pivotally connected to the side bars 21 of the hand-frame, as at 30, and are by springs 31 normally moved rearwardly and kept in engagement with the front side of the rock-shaft 16 and clear of the grubbing-rake. The side arms 29 of said oscillating frame are so disposed with reference to the grubbing-rake that when the said oscillating frame is moved forwardly by the upward movement of the hand-frame when the rake-stop is disengaged from the rake said side arms 29 engage the ends of the clearing-frame 10 on the grubbing-rake and move the said clearing-frame forwardly on the grubbing-rake as the latter is being overturned, said clearing-frame disengaging the brush from the tines or bars of the rake, as will be understood. In the operation of the rake in grubbing up the sage-brush the latter as it sweeps rearwardly on the grubbing-rake engages the clearing-frame and moves the clearing-frame rearwardly on the grubbing-rake to the position indicated in Figs. 1 and 3.

In order to adapt the grubbing-rake to be disposed at any desired inclination for operation, the side bars of the frame 1 are provided with rearwardly-extending pivoted sections 32, which carry the rake-stop and the rockshaft 16. The said pivoted sections 32 are provided with hand-levers 33, by means of which they may be appropriately adjusted, and said hand-levers have spring-pressed locking-dogs 34, which by engagement with segment-racks 35 on the frame 1 secure the said levers, and hence the said rake-stop, at any desired adjustment.

I do not desire to limit myself in the precise construction and combination of devices hereinbefore described, as it is evident that modifications may be made therein without departing from the spirit of my invention.

Having thus described my invention, I claim—

1. In a brush-grubbing machine, the combination of a main frame, a revoluble grubbing-rake carried thereby, a stop to engage and release said grubbing-rake, and a clearing element, movable with relation to the rake, to clear the latter, substantially as described.

2. In a brush-grubbing machine, the combination of a main frame, a grubbing-rake carried thereby, and a movable clearing element on said grubbing-rake, substantially as described.

3. In a brush-grubbing machine, the combination of a main frame, a revoluble grubbing-rake carried thereby, a stop to engage and disengage said grubbing-rake, a movable clearing element on the latter and means to engage and operate said clearing element when said stop is disengaged from said grubbing-rake and the latter is being overturned, substantially as described.

4. The combination in a brush-grubbing machine, of a main frame, a revoluble grubbing-rake carried thereby, a stop to engage and disengage said grubbing-rake and an adjustable support for said stop, whereby said grubbing-rake may be disposed at any desired angle for operation, substantially as described.

5. In a machine for grubbing brush, the combination of a main frame, a revoluble grubbing-rake carried thereby, a movable clearing element on said rake, a stop carried by said main frame, and adapted to engage and disengage said rake, a manually-operated element connected to said stop to actuate the same, an oscillating frame carried by said manually-operated element and adapted to engage said clearing element, when said manually-operated element is raised and springs to normally move said oscillating frame out of engagement with said clearing element, substantially as described.

6. In a brush-grubbing machine, the combination of a main frame, a revoluble grubbing-rake carried thereby, a clearing element, movable with relation to the rake, to clear the latter, and means to operate said clearing element, substantially as described.

7. In a brush-grubbing machine, the combination of a main frame, a reversible revoluble rake carried thereby and having tines extending in opposite directions, an adjustable stop to engage and release said grubbing-rake, a clearing element movable with relation to the rake, to clear the latter, and means to operate said clearing element, substantially as described.

In testimony that I claim the foregoing as my own I have hereto affixed my signature in the presence of two witnesses.

WILLIAM O. WHITE.

Witnesses:
SAMUEL HAMILTON,
J. H. JENKINS.